(12) United States Patent
Ban et al.

(10) Patent No.: US 9,753,208 B2
(45) Date of Patent: Sep. 5, 2017

(54) ILLUMINATOR

(71) Applicants: HONDA MOTOR CO., LTD., Tokyo (JP); Stanley Electric Co., Ltd., Tokyo (JP)

(72) Inventors: Kazuya Ban, Tochigi (JP); Kentaro Shimizu, Tochigi (JP); Masahiro Sagawa, Kanagawa (JP); Kotaro Oku, Tochigi (JP)

(73) Assignees: HONDA MOTOR CO., LTD., Tokyo (JP); STANLEY ELECTRIC CO., LTD., Tokyo (JP)

( * ) Notice: Subject to any disclaimer, the term of this patent is extended or adjusted under 35 U.S.C. 154(b) by 16 days.

(21) Appl. No.: 14/857,345

(22) Filed: Sep. 17, 2015

(65) Prior Publication Data

US 2016/0091653 A1    Mar. 31, 2016

(30) Foreign Application Priority Data

Sep. 29, 2014   (JP) ................................ 2014-198299

(51) Int. Cl.
   *F21V 8/00*    (2006.01)
   *F21S 8/10*    (2006.01)

(52) U.S. Cl.
   CPC ........ *G02B 6/0043* (2013.01); *F21S 48/2243* (2013.01); *F21S 48/2281* (2013.01); *F21S 48/24* (2013.01); *G02B 6/0035* (2013.01); *G02B 6/0068* (2013.01); *F21S 48/215* (2013.01); *G02B 6/0038* (2013.01); *G02B 6/0045* (2013.01)

(58) Field of Classification Search
   CPC .. F21S 48/215; F21S 48/2243; F21S 48/2281; F21S 48/24; G02B 6/0035; G02B 6/0038; G02B 6/0043; G02B 6/0045; G02B 6/0068
   See application file for complete search history.

(56) References Cited

U.S. PATENT DOCUMENTS

| 8,322,902 | B2* | 12/2012 | Martin | F21S 48/215 |
| | | | | 362/498 |
| 8,733,991 | B2* | 5/2014 | Fukasawa | B60Q 1/2665 |
| | | | | 362/267 |
| 8,876,355 | B2* | 11/2014 | Nomoto | G02B 6/002 |
| | | | | 358/475 |
| 2004/0130912 | A1* | 7/2004 | Miyashita | G02B 6/002 |
| | | | | 362/561 |

(Continued)

FOREIGN PATENT DOCUMENTS

| CN | 102022696 A | 4/2011 | |
| EP | 1953451 | * 8/2008 | ............ F21V 8/00 |
| JP | 2002-156632 A | 5/2002 | |

(Continued)

*Primary Examiner* — Peggy Neils
(74) *Attorney, Agent, or Firm* — Kenealy Vaidya LLP

(57) ABSTRACT

An illuminator includes a strip-shaped light guide and a plurality of light sources. The light sources are disposed along one end surface in the width direction of the light guide to allow light to be incident on the one end surface. The light guide guides the light of the light sources from the one end surface to the other end surface in the width direction of the light guide. The one end surface and the other end surface of the light guide are light-diffusing surfaces. The width of the light guide is larger than the thickness of the light guide.

4 Claims, 5 Drawing Sheets

(56) References Cited

U.S. PATENT DOCUMENTS

| | | | | |
|---|---|---|---|---|
| 2008/0013333 A1* | 1/2008 | Koizumi | ............. | B60Q 1/2696 362/511 |
| 2015/0277027 A1* | 10/2015 | Koizumi | ............. | G02B 6/0076 362/511 |

FOREIGN PATENT DOCUMENTS

| JP | 2007-188645 A | 7/2007 |
|---|---|---|
| JP | 2009-212088 A | 9/2009 |
| JP | 2013-191406 A | 9/2013 |
| JP | 2014-22212 A | 2/2014 |
| JP | 2014-86202 A | 5/2014 |

\* cited by examiner

ILLUMINATOR

BACKGROUND OF THE INVENTION

1. Field of the Invention

The present invention relates to an illuminator and more particularly to a technique using a strip-shaped light guide.

2. Description of Related Art

Japanese Unexamined Patent Application Publication No. 2014-86202 discloses the following illuminator for a vehicle: multiple LEDs facing downward are arranged at some interval in the horizontal direction, multiple reflectors are disposed under the respective LEDs, the reflectors are arranged in the direction in which the LEDs are arranged, and a transparent strip-shaped front plate is disposed in front of the reflectors. The front plate, which is upright, extends in the horizontal direction. The thickness in the front-back direction of the front plate is smaller than the width in the up-down direction of the front plate. The front plate has a textured back surface. When the LEDs emit light and the front plate is seen from the front, the front plate looks luminous along a strip shape.

Unfortunately, the light emitted from the LEDs has high directional characteristics, and a part, in front of each reflector, of the front plate is more luminous than parts, in front of areas between the reflector and reflectors on both sides of the reflector, leading to unevenness in brightness in the front plate. That is, the front plate looks as if bright parts and dark parts are alternately disposed in the horizontal direction.

SUMMARY OF THE INVENTION

In view of the above, an object of the present invention is to provide a band of uniform emitted light with reduced unevenness in brightness.

To achieve the above object, an aspect of the present invention is an illuminator including: a strip-shaped light guide; and a plurality of light sources disposed along one end surface in a width direction of the light guide, the light sources allowing light to be incident on the one end surface, wherein the light guide guides the light of the light sources from the one end surface to the other end surface in the width direction of the light guide; the one end surface and the other end surface of the light guide are light-diffusing surfaces; and a width of the light guide is larger than a thickness of the light guide.

Preferably, the thickness of the light guide gradually decreases from the one end surface toward the other end surface of the light guide.

Preferably, one side in a thickness direction of the light guide includes a light-diffusing area adjacent to the other end surface, and a smooth area adjacent to the one end surface.

Preferably, the other side in the thickness direction of the light guide has a plurality of grooves extending in a longitudinal direction of the light guide, the grooves having light-diffusing inner surfaces.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

An embodiment to carry out the present invention will now be described below with reference to the drawings. The embodiment described below includes various limitations that are technically preferable to carry out the present invention. The technical scope of the present invention is not limited to the embodiment and the drawings.

Figure 1:
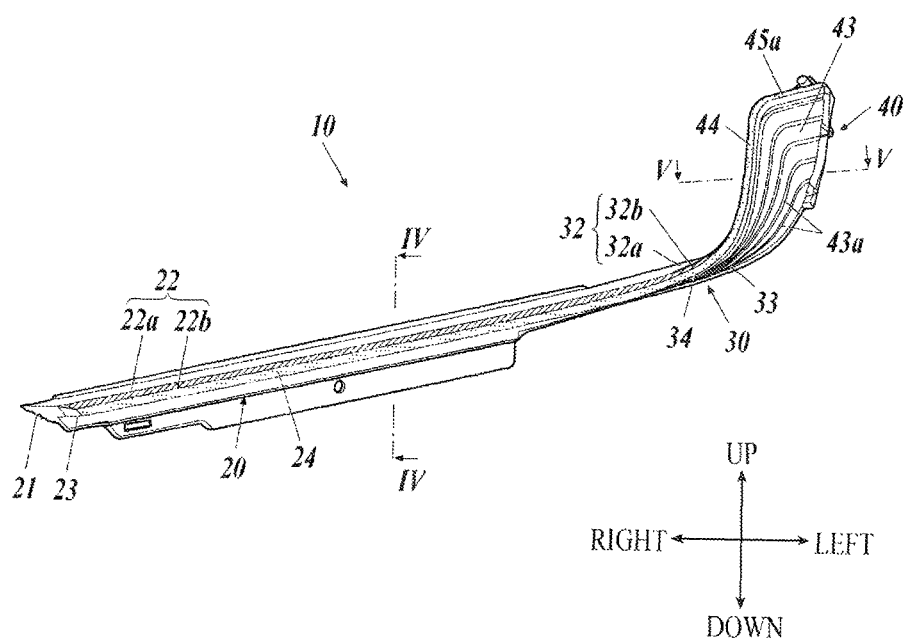
FIG. 1 is a front view of a light guiding body for an illuminator.
Figure 2:
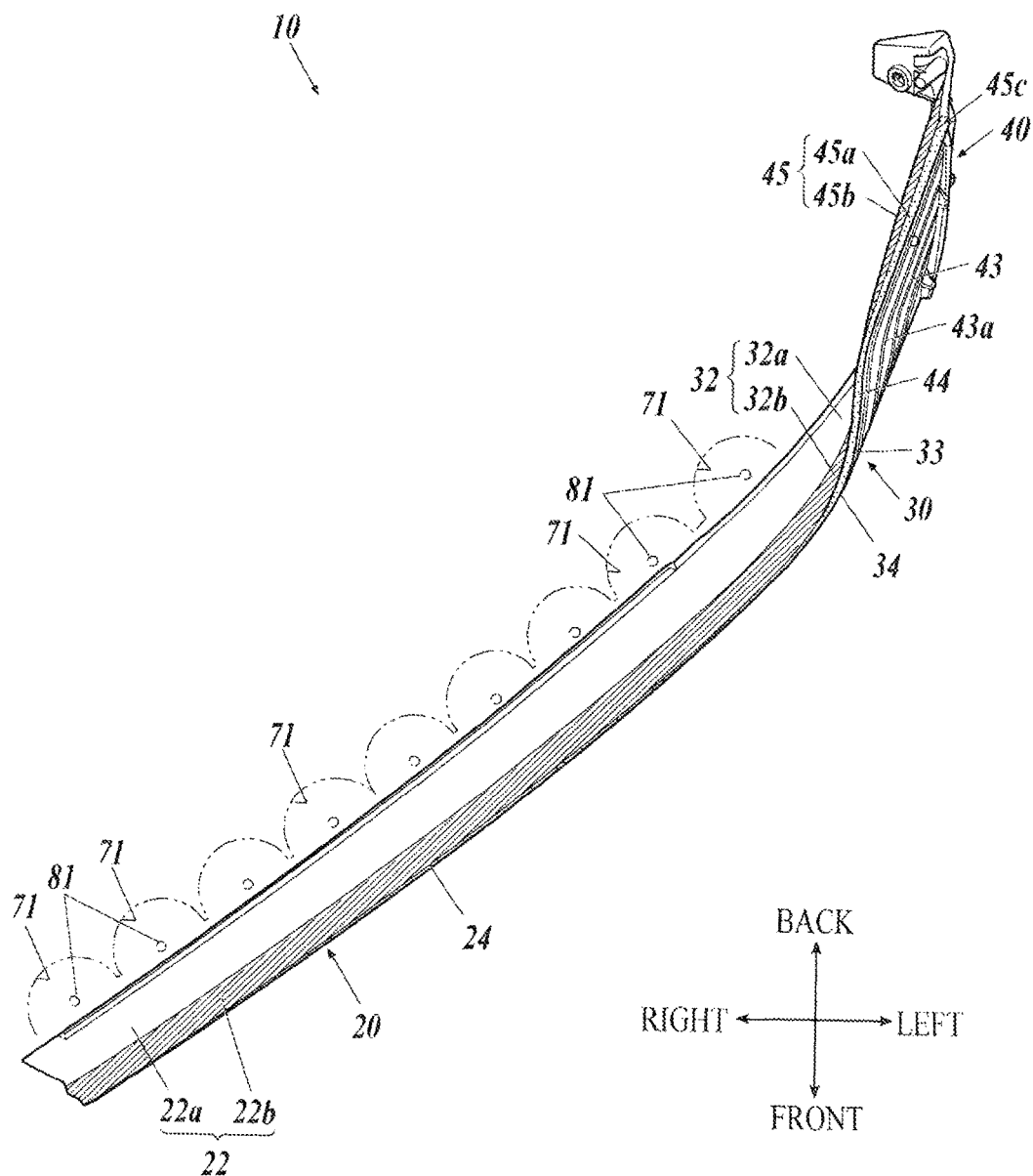
FIG. 2 is a top view of the light guiding body.
Figure 3:
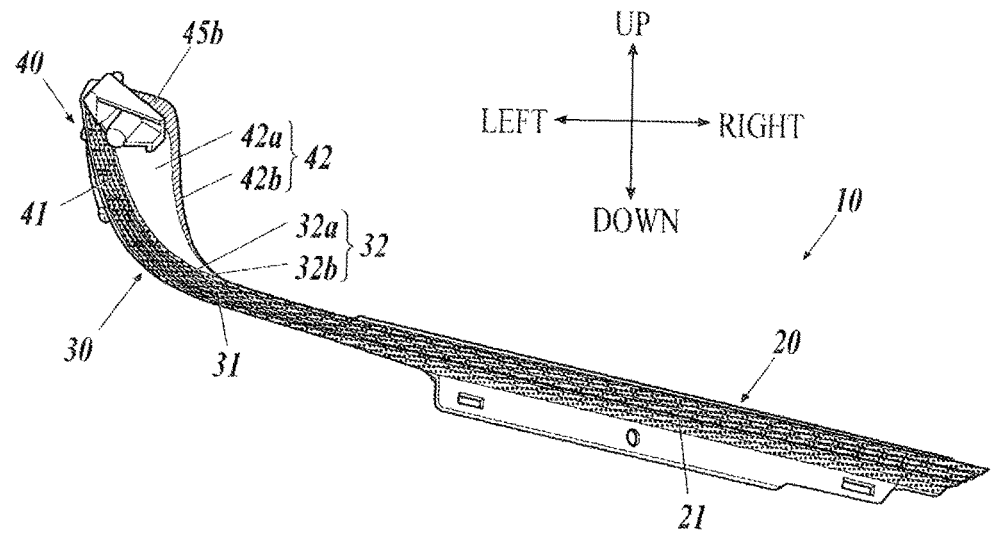
FIG. 3 is a back view of the light guiding body.
Figure 4:
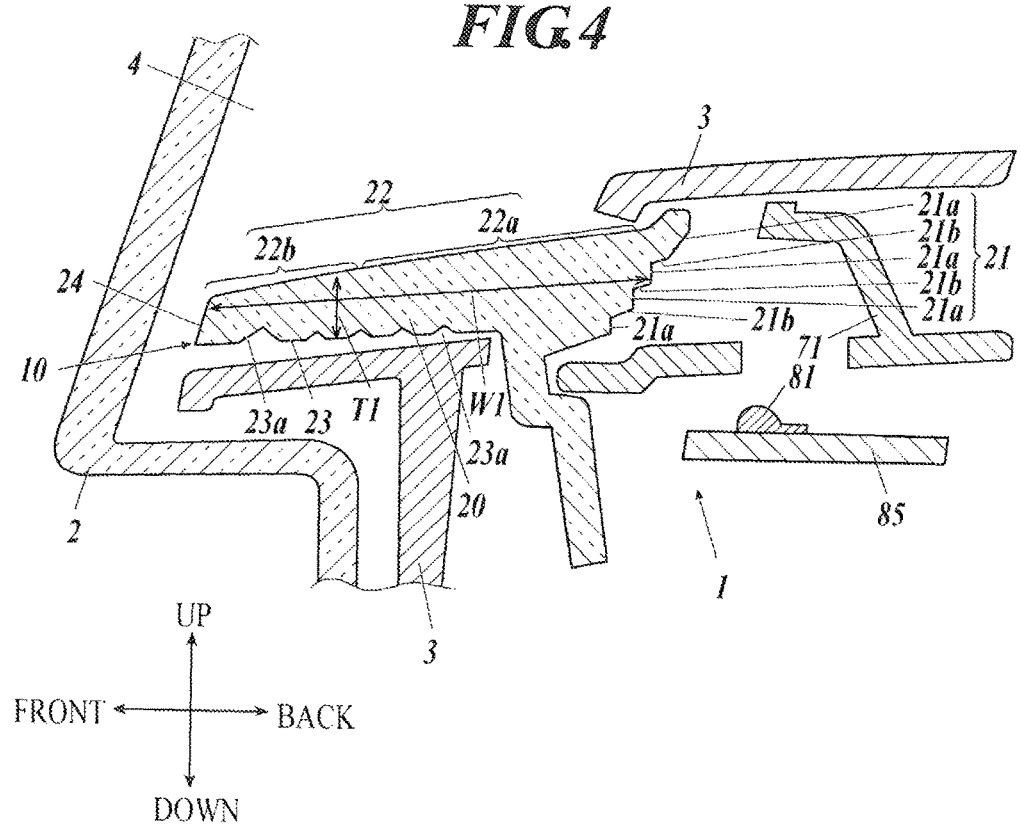
FIG. 4 is a cross-sectional view showing a section along the line IV-IV of FIG. 1.
Figure 5:
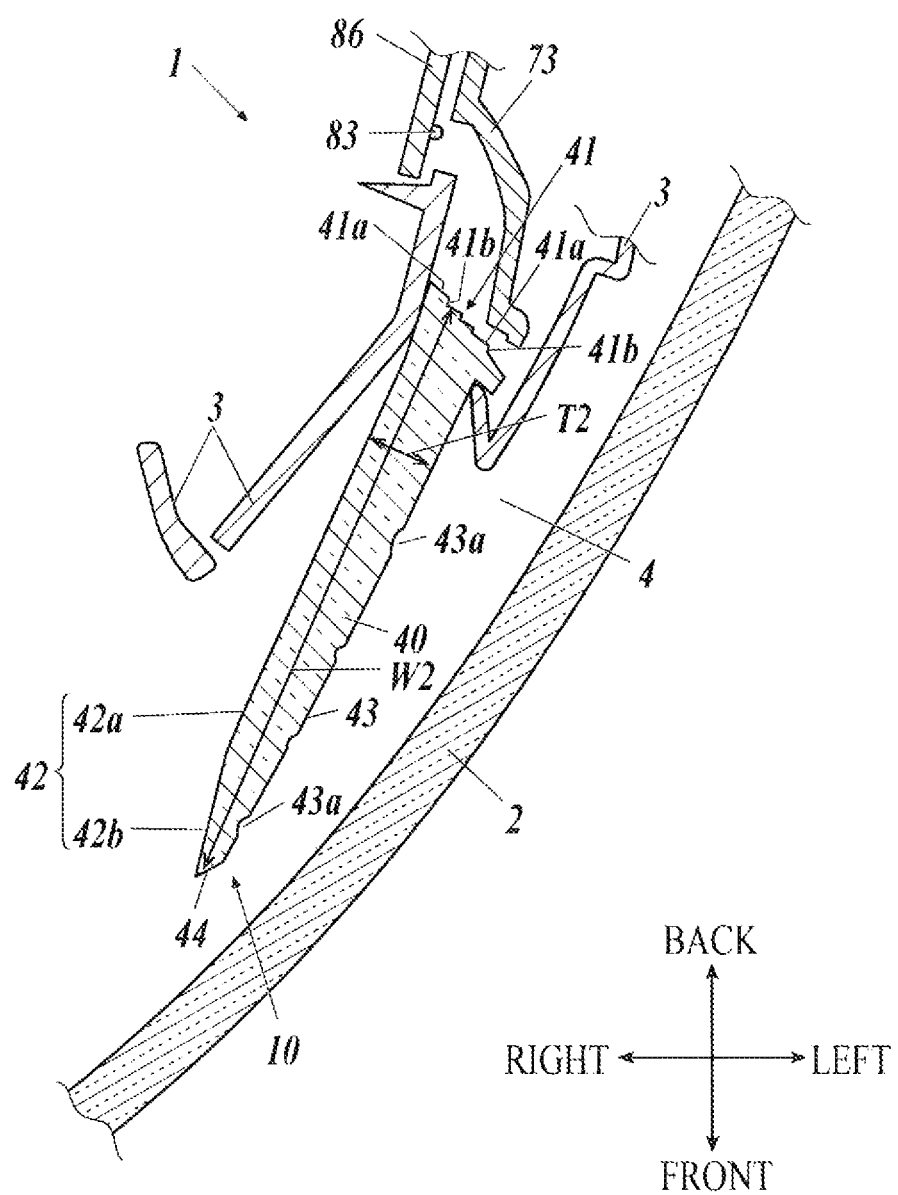
FIG. 5 is a cross-sectional view showing a section along the line V-V of FIG. 1.

An illuminator 1 for a vehicle will now be described with reference to FIGS. 1 to 5. FIG. 1 is a front view of a light guiding body 10 for the illuminator 1. FIG. 2 is a top view of the light guiding body 10. FIG. 3 is a back view of the light guiding body 10. FIG. 4 is a cross-sectional view of the illuminator 1 showing a section along the line IV-IV of FIG. 1 viewed from the direction indicated by the arrows. FIG. 5 is a cross-sectional view of the illuminator 1 showing a section along the line V-V of FIG. 1 viewed from the direction indicated by the arrows. In the following description, "front", "back", "left", "right", "up", and "down" refer to "front", "back", "left", "right", "up", and "down", respectively, with respect to a vehicle equipped with the illuminator 1.

The illuminator 1 is a sidelight contained in a front left combination headlamp. The combination headlamp contains a headlight for running and a headlight for passing another vehicle etc. in addition to the illuminator 1. A sidelight contained in a front right combination headlamp is the one obtained by reversing the illuminator 1. That is, the front right sidelight is the mirror image of the front left sidelight (illuminator 1).

As shown in FIGS. 4 and 5, the combination headlamp containing the illuminator 1 is provided with a housing, an outer lens 2, and an extension 3. The outer lens 2 is a transparent cover. The housing, which is hollow, is open toward the front and the front opening of the housing is covered with the outer lens 2 fixed to the housing. A light room 4 enclosed by the housing and the outer lens 2 is thus formed inside of the housing and the outer lens 2. The illuminator 1, the headlight for running, the headlight for passing another vehicle, and the extension 3 are mounted in the light room 4. When the combination headlamp is seen from the front, it looks as if the extension 3 closes the gaps around the illuminator 1, the headlight for running, and the headlight for passing another vehicle.

The illuminator 1 may be used for vehicle lights other than sidelights, such as taillights, brake lights, direction indicator lights, and backup lights. Further, the illuminator 1 may be used for purposes other than for vehicle lights, such as general illuminators, emergency illuminators, illuminators for household use, illuminators for business use, and decorative illuminators.

The illuminator 1 includes a light guiding body 10.

The light guiding body 10 is attached to the extension 3 in such a way that the extension 3 encloses the top, bottom, right, and left of the light guiding body 10. The light guiding body 10 is made of a transparent strip-shaped plate extending from the front right toward the back left and twisted about an axis extending in the longitudinal direction of the light guiding body 10. The term "longitudinal direction of the light guiding body 10" here refers to the direction from the front right toward the back left and the reverse direction thereof.

The light guiding body 10 includes a horizontal strip-shaped light guide part 20, a twisted strip-shaped light guide part 30, and a vertical strip-shaped light guide part 40. The horizontal strip-shaped light guide part 20 extends from the front right toward the back left and is laid facedown. The twisted strip-shaped light guide part 30 is continuous with and extends left backward from the horizontal strip-shaped light guide part 20, with the parts 20 and 30 formed as a single piece. The vertical strip-shaped light guide part 40 is continuous with the twisted strip-shaped light guide part 30 and extends upward from the twisted strip-shaped light guide part 30. The vertical strip-shaped light guide part 40 and the twisted strip-shaped light guide part 30 are formed as a single piece. The twisted strip-shaped light guide part 30 is bent with respect to the axis extending in the longitudinal direction of the horizontal strip-shaped light guide part 20 in such a way that the horizontal strip-shaped light guide part 20 and the vertical strip-shaped light guide part 40 are shifted from each other by 90 degrees with respect to the longitudinal direction of the horizontal strip-shaped light guide part 20 (or the longitudinal direction of the light guiding body 10). The vertical strip-shaped light guide part 40 is upright with respect to the horizontal strip-shaped light guide part 20.

The width W1 of the horizontal strip-shaped light guide part 20 is larger than the thickness T1 of the horizontal strip-shaped light guide part 20. The width W1 of the horizontal strip-shaped light guide part 20 refers to the distance in the direction from the front left toward the back right and the reverse direction thereof. The thickness T1 of the horizontal strip-shaped light guide part 20 refers to the distance in the up-down direction.

The width W2 of the vertical strip-shaped light guide part 40 is larger than the thickness T2 of the vertical strip-shaped light guide part 40. The width W2 of the vertical strip-shaped light guide part 40 refers to the distance in the direction from the front right toward the back left and the reverse direction thereof. The thickness T2 of the vertical strip-shaped light guide part 40 refers to the distance in the direction from the front left toward the back right and the reverse direction thereof.

The back surface (or one end surface in the width direction) of the horizontal strip-shaped light guide part 20 has an incidence surface 21. The incidence surface 21 is a textured light diffusing transmission surface (light-diffusing surface).

The incidence surface 21 is a stepped surface (see FIG. 4). That is, the incidence surface 21 has multiple upright surfaces 21a and stair surfaces 21b alternately disposed. Each of the upright surfaces 21a has a strip shape, extends in the longitudinal direction of the horizontal strip-shaped light guide part 20, and faces toward the back right. Each of the stair surfaces 21b has a strip shape, extends in the longitudinal direction of the horizontal strip-shaped light guide part 20, and faces downward.

The upper side 22 of the horizontal strip-shaped light guide part 20 slopes down toward the front relative to the lower side 23. The thickness T1 of the horizontal strip-shaped light guide part 20 gradually decreases from the back right toward the front left.

A back area (i.e., an area adjacent to one end in the width direction) of the upper side 22 of the horizontal strip-shaped light guide part 20 has a smooth reflection surface 22a. The rest (i.e., a front area or an area adjacent to the other end in the width direction) of the upper side 22 of the horizontal strip-shaped light guide part 20 has a textured light-diffusing surface 22b. Each of the reflection surface 22a and the light-diffusing surface 22b has a strip shape and extends in the longitudinal direction of the horizontal strip-shaped light guide part 20.

The lower side 23 of the horizontal strip-shaped light guide part 20 has multiple grooves 23a each of which is triangular in cross-section. The grooves 23a extend in the longitudinal direction of the horizontal strip-shaped light guide part 20. The inner surfaces of the groove 23a are textured. The lower side 23 of the horizontal strip-shaped light guide part 20 is smooth except for the inner surfaces of the grooves 23a.

The front surface (or the other end surface in the width direction) of the horizontal strip-shaped light guide part 20 has an output surface 24. The output surface 24 is a textured light diffusing transmission surface.

The twisted strip-shaped light guide part 30 is continuous with and extends left backward from the horizontal strip-shaped light guide part 20 and is twisted. The vertical strip-shaped light guide part 40 is further continuous with and extends upward from the twisted strip-shaped light guide part 30. Accordingly, the inner side 32 of the twisted strip-shaped light guide part 30 is continuous with and extends left backward from the upper side 22 of the horizontal strip-shaped light guide part 20 and is twisted rightward, and the right side 42 of the vertical strip-shaped light guide part 40 is continuous with and extends upward from the inner side of the twisted strip-shaped light guide part 30. The outer side 33 of the twisted strip-shaped light guide part 30 is continuous with and extends left backward from the lower side 23 of the horizontal strip-shaped light guide part 20 and is twisted leftward, and the left side 43 of the vertical strip-shaped light guide part 40 is continuous with and extends upward from the outer side 33 of the twisted strip-shaped light guide part 30. One end surface 31 in the width direction of the twisted strip-shaped light guide part 30 is continuous with and extends left backward from the incidence surface 21 of the horizontal strip-shaped light guide part 20 and is twisted downward and backward, and the back surface (or one end surface in the width direction) 41 of the vertical strip-shaped light guide part 40 is continuous with and extends upward from one end surface 31 in the width direction of the twisted strip-shaped light guide part 30. The other end surface 34 in the width direction of the twisted strip-shaped light guide part 30 is continuous with and extends left backward from the output surface 24 of the horizontal strip-shaped light guide part 20 and is twisted front-upward, and the front surface (or the other end surface in the width direction) 44 of the vertical strip-shaped light guide part 40 is continuous with and extends upward from the other end surface 34 in the width direction of the twisted strip-shaped light guide part 30.

Since the strip-shaped light guide part 30 is twisted, the inner side 32 of the twisted strip-shaped light guide part 30 is a cylindrically concave surface and the outer side 33 of the twisted strip-shaped light guide part 30 is a cylindrical convex surface.

One end surface 31 in the width direction of the twisted strip-shaped light guide part 30 is a textured incidence surface. The end surface 31 is a stepped surface in the same manner as the incidence surface 21 of the horizontal strip-shaped light guide part 20. Specifically, the end surface 31 has multiple upright surfaces continuous with and extending left backward from the upright surfaces 21a of the incidence surface 21 and has multiple stair surfaces continuous with and extending left backward from the stair surfaces 21b of the incidence surface 21.

A back area of the inner side 32 of the twisted strip-shaped light guide part 30 is a smooth reflection surface 32a, and the rest (or a front area) of the inner side 32 is a light-diffusing surface 32b, in the same manner as the upper side 22 of the strip-shaped light guide part 20.

The outer side 33 of the twisted strip-shaped light guide part 30 has multiple grooves continuous with the respective grooves 23a formed in the lower side 23 of the horizontal strip-shaped light guide part 20. The inner surfaces of the grooves are also textured. The outer side 33 of the twisted strip-shaped light guide part 30 is smooth except for the inner surfaces of the grooves.

The other end surface 34 in the width direction of the twisted strip-shaped light guide part 30 is a textured output surface.

The width W2 of the vertical strip-shaped light guide part 40 gradually increases upward.

The back surface 41 of the vertical strip-shaped light guide part 40 has an incidence surface. The incidence surface (or the back surface 41) slopes down and directed backward and downward. The incidence surface (or the back surface 41) is a textured light diffusing transmission surface. The incidence surface (or the back surface 41) is a stepped surface (see FIG. 5) in the same manner as the incidence surface 21 of the horizontal strip-shaped light guide part 20 and the end surface 31 of the twisted strip-shaped light guide part 30. Specifically, the incidence surface (or the back surface 41) has multiple upright surfaces 41a continuous with and extending upward from the respective upright surfaces of the end surface 31 of the twisted strip-shaped light guide part 30, and has multiple stair surfaces 41b continuous with and extending upward from the respective stair surfaces of the end surface 31 of the twisted strip-shaped light guide part 30.

A right side 42 of the vertical strip-shaped light guide part 40 slopes backward and is directed backward right. A back area of the side 42 is a smooth reflection surface 42a, and the rest (or a front area) of the side 42 is a light-diffusing surface 42b, in the same manner as the upper side 22 of the strip-shaped light guide part 20.

A left side 43 of the vertical strip-shaped light guide part 40 slopes forward and is directed forward left. The side 43 has multiple grooves 43a continuous with the respective grooves formed in the outer side 33 of the twisted strip-shaped light guide part 30. The inner surfaces of the grooves 43a are textured, and the left side 43 of the vertical strip-shaped light guide part 40 is smooth except for the inner surfaces of the grooves 43a.

The front surface 44 of the vertical strip-shaped light guide part 40 has an output surface. The output surface (or front surface 44) slopes upward left and is directed upward to the front left. The output surface (or front surface 44) is a textured light diffusing transmission surface.

The vertical strip-shaped light guide part 40 has a wedge-shaped upper end part 45. The edge line 45c of the upper end part 45 extends from the front right toward the front left. A sloping surface 45a disposed on the front left side with respect to the edge line 45c slopes downward to the front left, and a sloping surface 45b disposed on the back right side with respect to the edge line 45c slopes downward to the back right. The sloping surface 45a has a strip shape and extends from the upper edge of the output surface (or front surface 44) along the edge line 45c. The sloping surface 45a and the output surface (or front surface 44) are continuous with each other. The sloping surface 45b has a strip shape and extends from the upper edge of the light-diffusing surface 22b along the edge line 45c. The sloping surface 45b and the light-diffusing surface 22b are continuous with each other. The sloping surface 45a is a textured output surface, and the sloping surface 45b is a textured light-diffusing surface.

The light guiding body 10, which is disposed on the back of the outer lens 2, can be seen from the front of the outer lens 2. The twisted and curvy light guiding body 10 enhances the design qualities of the illuminator 1.

Since the twisted light guiding body 10 has the grooves and textured surfaces as described above, the appearance of the light guiding body 10 varies depending on the angle from which the light guiding body 10 is seen. The illuminator 1 thus greatly has an element of surprise in design.

Figure 6:
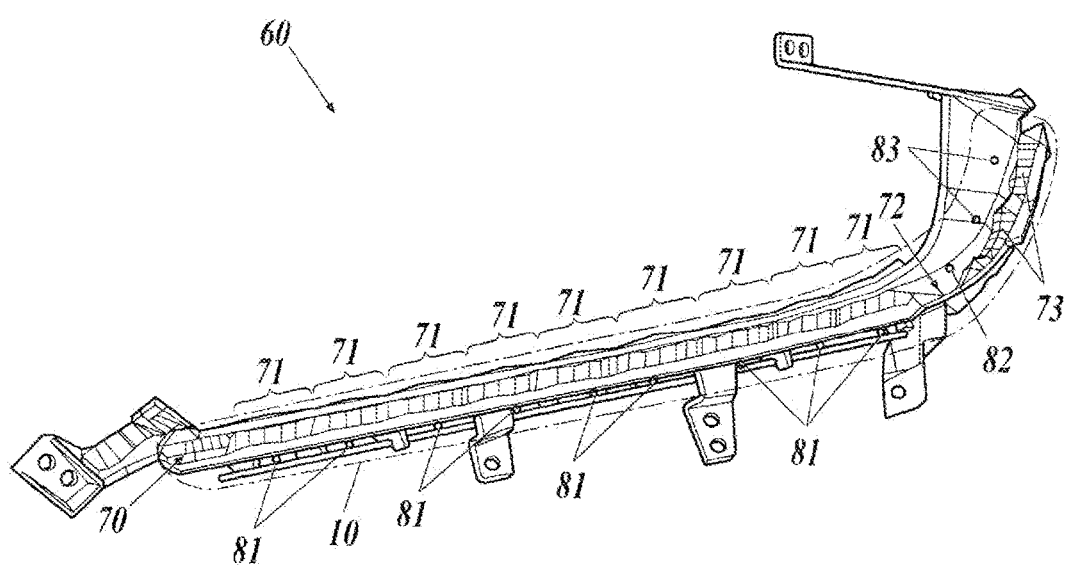
FIG. 6 is a front view of a light-emitting device for the illuminator.

A light-emitting device 60 whose front view is shown in FIG. 6 is disposed behind the light guiding body 10 having the configuration as described above. The light guiding body 10 takes in the light emitted from the light-emitting device 60, guides the light that has been taken therein, and delivers the guided light forward and diagonally forward left to distribute the light (or spatially distribute the light).

The light-emitting device 60 includes a reflector array 70 and a light source array. The light source array includes multiple light sources 81, a light source 82, and multiple light sources 83. The light sources 81, 82, and 83 are semiconductor light-emitting elements, such as light-emitting diodes (LEDs) or organic light-emitting diodes (OLEDs). Instead of semiconductor light-emitting elements, light bulbs or electric-discharge lamps may be used as the light sources 81, 82, and 83.

As shown in FIGS. 4 and 6, the light sources 81 are arranged in the longitudinal direction of the horizontal strip-shaped light guide part 20. Specifically, the light sources 81 are arranged behind and below the back surface (or the incidence surface 21) of the horizontal strip-shaped light guide part 20 along the back surface. The light sources 81 are disposed at a certain interval. The light sources 81 are mounted on a surface of a board 85 (see FIG. 4). The board 85 is fixed to the reflector array 70 in such a way that the surface of the board 85 having the light sources 81 thereon faces upward. The light sources 81 emit light upward and the optical axis of each light source 81 extends leftward. The optical axis of a light source 81 refers to an imaginary line extending from the light source 81 in the direction of the maximal intensity of light in the spatial distribution of intensity (i.e., intensity distribution) of the light emitted from the light source 81. The same applies to the optical axes of the light sources 82 and 83.

The light source 82 is disposed on the back upper right of one end surface (or the incidence surface) 31 in the width direction of the twisted strip-shaped light guide part 30. The light source 82 is mounted on a surface of a board, and the board is fixed to the reflector array 70. The light source 82 faces downward left, so that the optical axis of the light source 82 extends downward left from the light source 82.

As shown in FIGS. 5 and 6, the light sources 83 are arranged on the back right of the back surface (or the incidence surface) 41 of the vertical strip-shaped light guide part 40 along the back surface 41. The light sources 83 are arranged at a certain interval. The light sources 83 are mounted on a surface of a board 86, and the board 86 is fixed to the reflector array 70. The light sources 83 face leftward, so that the optical axes of the light sources 83 extend leftward from the light sources 83.

The reflector array 70 is a molded article made of resin. The surface of the reflector array 70 is coated with a metallic luster film formed by vapor deposition, sputtering, or plating. The reflector array 70 includes multiple reflectors 71, a reflector 72, and multiple reflectors 73 which are formed as a single piece.

As shown in FIGS. 4 and 6, the reflectors 71 are arranged behind and along the back surface (or the incidence surface 21) of the horizontal strip-shaped light guide part 20. The reflectors 71 are paraboloidal reflectors. Specifically, the front surfaces of the reflectors 71 are concave mirrors each having a shape of a paraboloid of revolution or a free-form surface based on a paraboloid of revolution. The reflectors 71 are designed to have focal points on the respective light sources 81.

The reflector 72 is disposed behind one end surface 31 in the width direction of the twisted strip-shaped light guide part 30. The front surface of the reflector 72 is a concave mirror having a shape of a paraboloid of revolution or a free-form surface based on a paraboloid of revolution. The reflector 72 is designed to have a focal point on the light source 82.

As shown in FIGS. 5 and 6, the reflectors 73 are disposed behind and along the back surface (or the incidence surface) 41 of the vertical strip-shaped light guide part 40. The front surfaces of the reflectors 73 are concave mirrors each having a shape of a paraboloid of revolution or a free-form surface based on a paraboloid of revolution. The reflectors 73 are designed to have focal points on the respective light sources 83.

The light emitted from the light sources 81 are reflected forward by the reflectors 71, and the reflected light is incident on the incidence surface 21 of the horizontal strip-shaped light guide part 20 to be taken into the horizontal strip-shaped light guide part 20. Since the incidence surface 21 is textured, the reflected light is diffused by the incidence surface 21 when passing through the incidence surface 21. The horizontal strip-shaped light guide part 20, which has taken the light therein, guides the light toward the light-diffusing surface 22b and the output surface 24. The guided light is output from the horizontal strip-shaped light guide part 20 through the light-diffusing surface 22b and the output surface 24. Since the light-diffusing surface 22b and the output surface 24 are textured, the light is diffused when passing through the light-diffusing surface 22b and the output surface 24.

When the light sources 81 emit light as described above, mainly the light-diffusing surface 22b and the output surface 24 look luminous. Accordingly, when the horizontal strip-shaped light guide part 20 is seen from the front, a strip-shaped bright part appears along the light-diffusing surface 22b and the output surface 24. Since the light reflected by the reflectors 71 diffuses when passing through the incidence surface 21, the uniformity in brightness of the strip-shaped bright part is enhanced. In particular, since the horizontal strip-shaped light guide part 20 has a strip shape having a large width W1, the light that has been incident on the incidence surface 21 easily diffuses while traveling toward the light-diffusing surface 22b and the output surface 24. The uniformity in brightness of the strip-shaped bright part is thus enhanced. Since the light is further diffused by the light-diffusing surface 22b and the output surface 24, the uniformity of the strip-shaped bright part is further enhanced. In other words, the bright part corresponding to the light reflected by a first reflector 71 and the bright part corresponding to the light reflected by a second reflector 71 next to the first reflector 71 overlap each other with the overlapping portion laterally wide, so that the strip-shaped bright part has uniform brightness.

Further, since the lower side 23 of the horizontal strip-shaped light guide part 20 has the multiple grooves 23a, streaks (or a horizontal stripe pattern) appear in the strip-shaped bright part along the light-diffusing surface 22b and the output surface 24. Even when the light sources 81 do not emit light, the stripe pattern appears through the light-diffusing surface 22b and the output surface 24. This enhances the design qualities of the illuminator 1.

Further, since the upper side 22 of the horizontal strip-shaped light guide part 20 slopes down forward and the incidence surface 21 of the horizontal strip-shaped light guide part 20 is textured, the incidence surface 21 looks luminous through the reflection surface 22a of the upper side 22 and the strip-shaped bright part appears along the incidence surface 21 when the horizontal strip-shaped light guide part 20 is seen from the front. Since the reflection surface 22a is a smooth surface, the light inside the horizontal strip-shaped light guide part 20 is likely to be totally reflected by the reflection surface 22a and the intensity of light passing through the reflection surface 22a is low. Thus the strip-shaped bright part appearing through the reflection surface 22a has a lower brightness than the strip-shaped bright part along the light-diffusing surface 22b and the output surface 24. That is, the strip-shaped bright parts are different from each other in brightness, leading to enhancement of the design qualities of the illuminator 1.

Since the incidence surface 21 has steps, streaks (or a horizontal stripe pattern) appear in the strip-shaped bright part appearing through the reflection surface 22a. Even when the light sources 81 do not emit light, a stripe pattern appears through the reflection surface 22a. This enhances the design qualities of the illuminator 1.

The light emitted from the light source 82 is reflected forward by the reflector 72, and the reflected light is incident on one end surface 31 in the width direction of the twisted strip-shaped light guide part 30 to be taken into the twisted strip-shaped light guide part 30. The end surface 31, which is a textured surface, causes the reflected light to diffuse when the reflected light passes through the end surface 31. The twisted strip-shaped light guide part 30 guides the light that has been taken therein toward the light-diffusing surface 32b and the end surface 34 on the opposite side. The guided light is output from the twisted strip-shaped light guide part 30 through the light-diffusing surface 32b and the end surface 34. The light-diffusing surface 32b and the end surface 34, which are textured surfaces, cause the light to diffuse when the light passes through the light-diffusing surface 32b and the end surface 34. Further, apart of the light guided in the twisted strip-shaped light guide part 30 is reflected by the light-diffusing surface 32b, and the reflected light is output from the twisted strip-shaped light guide part 30 through the outer side 33 (mainly at a front part of the surface 33) of the twisted strip-shaped light guide part 30. Apart of the light guided in the twisted strip-shaped light guide part 30 is transmitted and diffused through the inner surfaces of the grooves in the outer side 33 of the twisted strip-shaped light guide part 30.

As described above, when the light source 82 emits light and the twisted strip-shaped light guide part 30 is seen from the front, the end surface 34 and the grooves in the outer side 33 of the twisted strip-shaped light guide part 30 look luminous. When the twisted strip-shaped light guide part 30 is seen from the front right, the end surface 34 and the light-diffusing surface 32b of the twisted strip-shaped light guide part 30 look luminous, and the grooves in the outer side 33 of the twisted strip-shaped light guide part 30 look luminous through the reflection surface 32a. When the twisted strip-shaped light guide part 30 is seen from the front left, the end surface 34 and the grooves in the outer side 33 of the twisted strip-shaped light guide part 30 look luminous, and the light-diffusing surface 32b looks luminous through the outer side 33. The appearance of the twisted strip-shaped light guide part 30 thus varies depending on the angle from which the twisted strip-shaped light guide part 30 is seen, greatly providing an element of surprise in terms of the design of the illuminator 1. The same applies to when the light source 82 does not emit light.

The light reflected by the reflector 72 is diffused by the end surface 31, the light-diffusing surface 32b, and the end surface 34 of the twisted strip-shaped light guide part 30. The light reflected by the reflectors 71 is also diffused as described above. Thus there is little difference in brightness between the bright part of the twisted strip-shaped light guide part 30 and the bright part of the horizontal strip-shaped light guide part 20. That is, there is a high continuity between these bright parts.

The light emitted from the light sources 83 is reflected forward by the reflectors 73, and the reflected light is incident on the back surface 41 of the vertical strip-shaped light guide part 40 to be taken into the vertical strip-shaped light guide part 40. The back surface 41, which is a textured surface, causes the reflected light to diffuse when the light passes through the back surface 41. The vertical strip-shaped light guide part 40, which has taken the light therein, guides the light toward the light-diffusing surface 42b, the front surface 44, the sloping surface 45a, and the sloping surface 45b. The guided light is output from the vertical strip-shaped light guide part 40 through the light-diffusing surface 42b, the front surface 44, the sloping surface 45a, and the sloping surface 45b. The light-diffusing surface 42b, the front surface 44, the sloping surface 45a, and the sloping surface 45b, which are textured surfaces, cause the light to diffuse when the light passes through the surfaces 42b, 44, 45a, and 45b. A part of the light guided in the vertical strip-shaped light guide part 40 is reflected by the light-diffusing surface 42b and the sloping surface 45b, and the reflected light is output from the vertical strip-shaped light guide part 40 through the left side 43 (more specifically, a part, facing the light-diffusing surface 42b and the sloping surface 45b, of the side 43) of the vertical strip-shaped light guide part 40. Further, a part of the light guided in the vertical strip-shaped light guide part 40 is transmitted and diffused through the inner surfaces of the grooves 43a in the side 43 of the vertical strip-shaped light guide part 40.

As described above, when the light sources 83 emit light and the vertical strip-shaped light guide part 40 is seen from the front and left, the front surface 44, the grooves 43a, and the sloping surface 45a of the vertical strip-shaped light guide part 40 look luminous, and the light-diffusing surface 42b and the sloping surface 45b look luminous through the side 43. Since the light is diffused when passing through the back surface 41, the front surface 44, and the sloping surface 45a, the brightness uniformity of the bright part of the front surface 44 and the sloping surface 45a is enhanced.

Further, when the vertical strip-shaped light guide part 40 is seen from the front right, the front surface 44, the light-diffusing surface 42b, and the sloping surface 45b of the vertical strip-shaped light guide part 40 look luminous, and the grooves 43a look luminous through the reflection surface 42a. The parts which look luminous have high uniformity in brightness as well.

Embodiments to which the present invention is applicable are not limited to the embodiment described above, and modifications may be made as appropriate without departing from the gist of the present invention.

For example, the reflector array 70 may be omitted, and the light emitted from the light sources 81, 82, and 83 may directly enter the light guiding body 10. In this case, the light sources 81 are disposed along the incidence surface 21 of the horizontal strip-shaped light guide part 20 so as to face the incidence surface 21. Further, the light source 82 is disposed so as to face the end surface 31 of the twisted strip-shaped light guide part 30. Further, the light sources 83 are disposed along the back surface 41 of the vertical strip-shaped light guide part 40 so as to face the back surface 41.

According to a preferred embodiment of the present invention, the light emitted from the multiple light sources is incident on one end surface in the width direction of the strip-shaped light guide to be taken into the light guide. The light guide that has taken the light therein guides the light from one end surface to the other end surface of the light guide and allows the light to be output from the light guide through the other end surface. Accordingly, the other end surface in the width direction of the light guide looks luminous as a strip-shaped bright part. Since one end surface and the other end surface in the width direction of the light guide are light-diffusing surfaces, uniformity in brightness is enhanced at the other end surface in the width direction of the light guide. Since the width of the light guide is larger than the thickness of the light guide, in particular, the light diffusion effects of one end surface in the width direction of the light guide are enhanced. In other words, a first luminous area on the other end surface in the width direction of the light guide corresponding to a first light source and a second luminous area on the other end surface in the width direction of the light guide corresponding to a second light source next to the first light source overlap each other with the overlapping portion wide, so that the other end surface in the width direction of the light guide has a high uniformity in brightness.

The entire disclosure of Japanese Patent Application No. 2014-198299 filed on Sep. 29, 2014 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:
1. An illuminator comprising:
a strip-shaped light guide; and
a plurality of light sources disposed along one end surface in a width direction of the light guide, the light sources allowing light to be incident on the one end surface, wherein
the light guide guides the light of the light sources from the one end surface to the other end surface in the width direction of the light guide;
the one end surface and the other end surface of the light guide are light-diffusing surfaces; and
a width of the light guide is larger than a thickness of the light guide,
the light guide part includes a horizontal strip-shaped light guide part, a vertical strip-shaped light guide part and a twisted strip-shaped light guide part which is con- tinuous with one end in a longitudinal direction of the horizontal strip-shaped light guide part and connects the horizontal strip-shaped light guide part with the vertical strip-shaped light guide part, the twisted strip-shaped light guide part is twisted with respect to an axis extending in a longitudinal direction of the horizontal strip-shaped light guide part in such a way that directions of main surfaces of the horizontal strip-shaped light guide part and the vertical strip-shaped light guide part are different from each other with respect to the longitudinal direction of the horizontal strip-shaped light guide part, and the plurality of light sources is disposed over the horizontal strip-shaped light guide part, the vertical strip-shaped light guide part and the twisted strip-shaped light guide part in the light guide.

2. The illuminator according to claim 1, wherein the thickness of the light guide gradually decreases from the one end surface toward the other end surface of the light guide.

3. The illuminator according to claim 1, wherein one side in a thickness direction of the light guide includes a light-diffusing area adjacent to the other end surface and a smooth area adjacent to the one end surface.

4. The illuminator according to claim 1, wherein one other side in a thickness direction of the light guide has a plurality of grooves extending in a longitudinal direction of the light guide, the grooves having light-diffusing inner surfaces.

* * * * *